March 31, 1964 A. J. TRENTESEAUX 3,127,293
METHOD OF PRODUCING UNWOVEN CLOTHS AND VELVETS
AND APPARATUS USED THEREFOR
Filed July 29, 1960 5 Sheets-Sheet 1

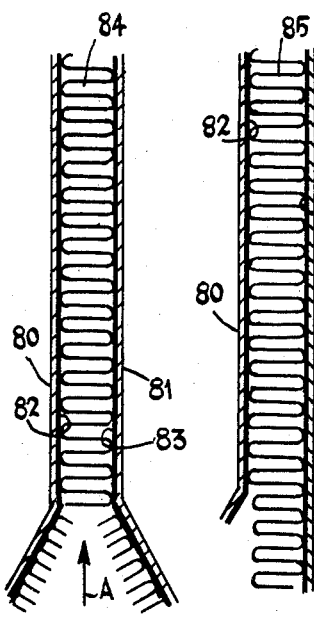
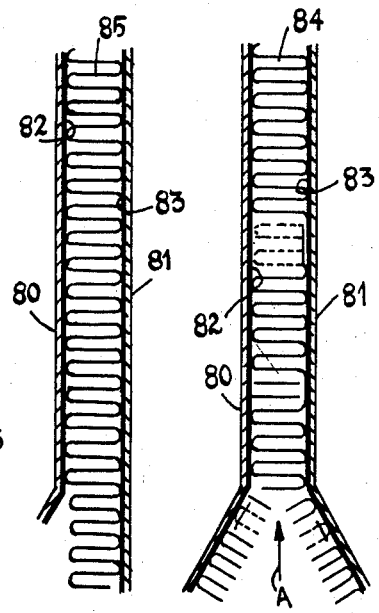
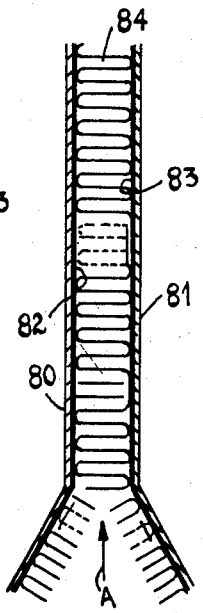
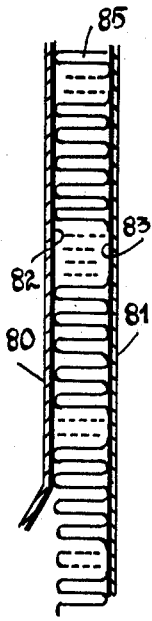
FIG. 5a   FIG. 5b   FIG. 5c   FIG. 5d
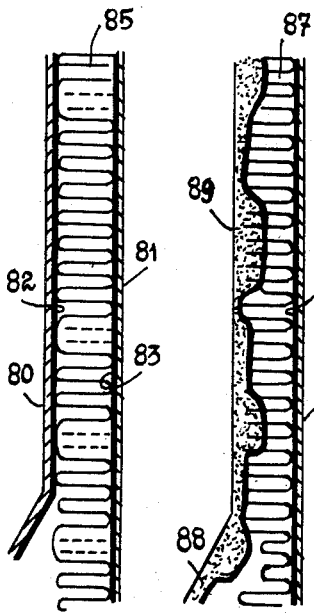
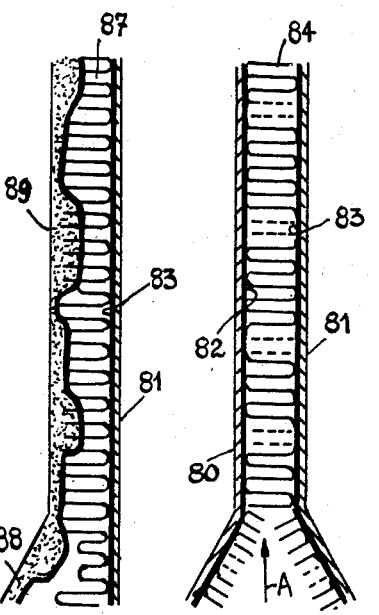
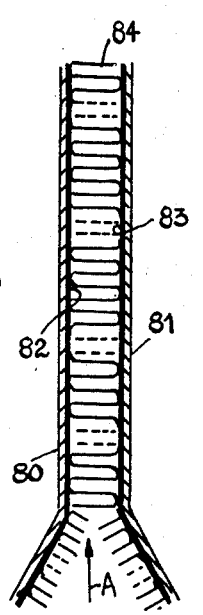
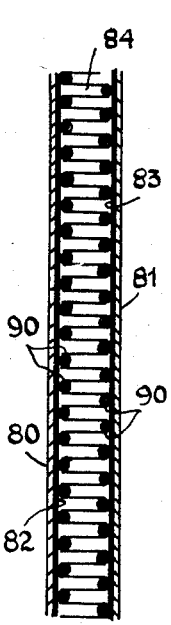
FIG. 5e   FIG. 5f   FIG. 5g   FIG. 5h

United States Patent Office 3,127,293
Patented Mar. 31, 1964

3,127,293
METHOD OF PRODUCING UNWOVEN CLOTHS AND VELVETS AND APPARATUS USED THEREFOR
Albert Jean Trenteseaux, Mouscron, Belgium, assignor to Societe d'Etudes et Recherches et d'Exploitation d'Inventions Nouvelles Etablissement, Vaduz, Liechtenstein
Filed July 29, 1960, Ser. No. 46,150
Claims priority, application Belgium Aug. 4, 1959
4 Claims. (Cl. 156—72)

The present invention relates generally to the manufacture of cloth and velvet of unwoven nature, and more particularly to a method and an apparatus for the manufacture of these products. It also relates to unwoven cloth and velvet produced by this method.

In known arrangements for the manufacture of unwoven cloth or velvet, the start consists in forming a chain of velvet fibres or filaments, which are each lengthwise folded in zig-zag or harmonica shape, after which a liquid synthetic resin is poured on this chain or layer, followed by the setting of this plastics material so as to create a support in which the filaments of the chain are partially embedded.

It is an object of the present invention to provide a process and an apparatus for the production of unwoven cloths and velvets of widely varying textures, since hitherto known processes and appliances make possible only the production of a very limited range of articles. Moreover, the present invention has also the object of providing a method and arrangement for the production of unwoven cloth and velvet of better quality than those produced by means of hitherto known methods.

Other objects and advantages of the invention will become apparent from the following description and the claims.

The method of the invention for the manufacture of unwoven cloth and velvet is characterized essentially by coating, on one side, two endless supporting bands with an adhesive layer, by passing these bands through a zone, in which they extend parallel and at a certain distance relative to one another, so that the adhesive layer on one support band faces that on the other support band, by applying the continuous elements alternatively to the adhesive layer on one band and to the adhesive layer on the other band, so that these continuous elements form a concertina-like pleat between these two bands, or are in zig-zag arrangement therebetween, and finally by ensuring the engagement of at least one layer of adhesive and by moving the support bands or strips away from each other.

The term "continuous element" as used in the present description, signifies either continuous filament or spun yarns of any kind, such as wool, cotton, synthetic resin, or the like, or bands or strips, for example of felt, plastic materials, tissue, paper, or the like, wherein the width of these strips may even be the same as that of the support bands.

In one embodiment of the method of the invention, the adhesive layer applied to each of the support bands or strips is caused to set, and the strips are then removed one from the other while the continuous elements connecting the two strips are cut, so that a cut design or pattern is obtained.

In another embodiment of the invention, only the adhesive layer applied to one of the bands is set, and the strips are removed one from the other by stripping the support strip, the adhesive layer of which has not set, from the assembly formed by the other support band carrying the continuous elements fixed in the hardened adhesive layer, so as to produce a curled design.

Both these support bands may be coated with an adhesive layer over their entire surfaces, or else at least one of the bands may have an adhesive layer only at certain positions of its surface.

In the case where one of the support bands is coated with a layer of adhesive over its entire surface, whilst the other support band carries an adhesive layer only at certain pre-determined positions of its surface, it is possible, after causing the setting of the adhesive layers applied to both these support bands, to remove one of these support bands from the other by cutting the continuous elements sticking to the two bands so as to produce two pieces of scissor-cut velvet, one of these pieces having undulations on a support strip, while the other has, at the appropriate positions, bare places.

In the case where one of the support bands is coated with a layer of adhesive over its entire surface, while the other support band carries an adhesive layer only at certain pre-determined positions of its surface, it is possible, after causing the setting of the adhesive layer only on the band to which this adhesive material has been applied intermittently, to remove one of these support bands from the other by stripping off the support band with the unhardened adhesive layer, so as to produce a curled design with "spaced" curls.

The arrangements of the continuous elements alternatively to the two support bands may be either continuous, or they may consist of a series of independent platens controlled by a mechanical, Jacquard-type selecting device which lifts, at certain predetermined positions, one platen and prevents it from applying the continuous elements against the adhesive of the support band, so as to produce a burnished, cut or curled design.

The equipment used for the realization of the method described hereinbefore consists essentially of arrangements for the application of an adhesive layer to two support bands, of guides urging said support bands through a zone in which they are located parallel relative to one another so that the adhesive layer of one band faces the adhesive layer of the other band at a certain given distance, arrangements for applying the continuous elements alternatively against one support band and then against the other support band in such a way that there is formed by the elements between the bands a zig-zag, accordion-like structure, means for assuring the setting of at least one adhesive layer, possibly also means for preventing the setting of one of these adhesive layers, and means for removing these support bands one from the other.

Other features and details of the process and equipment of the invention will become apparent from the following description, with reference to the drawings showing schematically an arrangement of the invention and some types of velvet or cloth of a non-woven kind, which may be produced according to this invention. In said drawings:

FIGS. 5a to 5h show in diagrammatic form a range of non-woven velvets and cloths which may be produced by the method of this invention.

In these figures, the same reference numerals have been used to indicate identical components.

Figure 1:
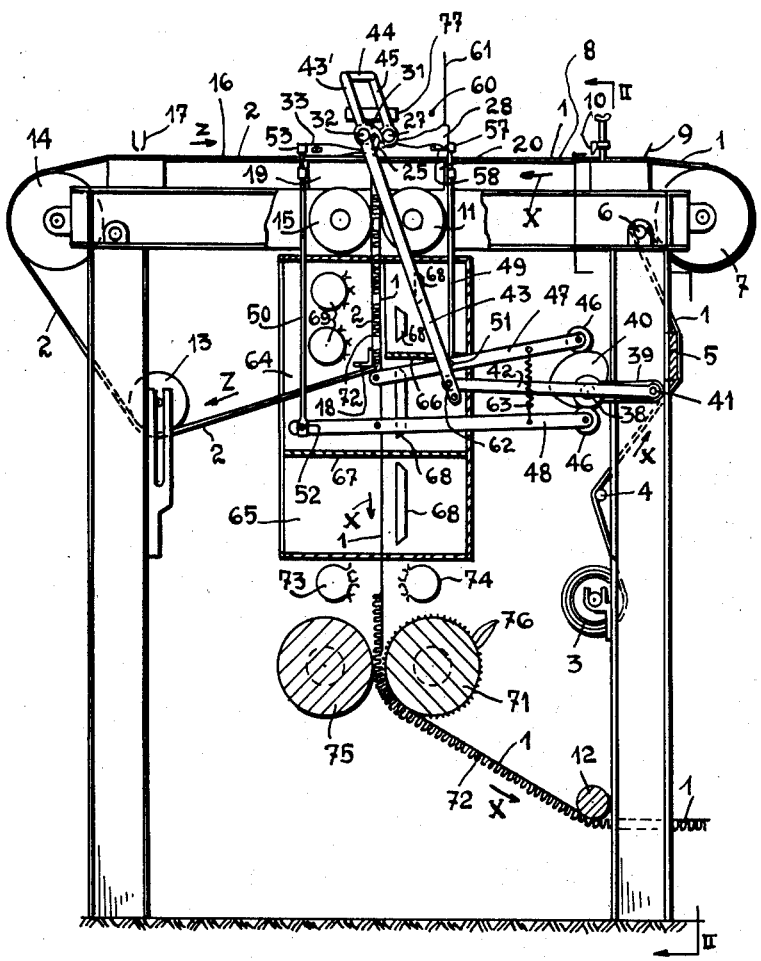
FIG. 1 is an elevation of an arrangement for the realization of the method of the invention.
Figure 2:
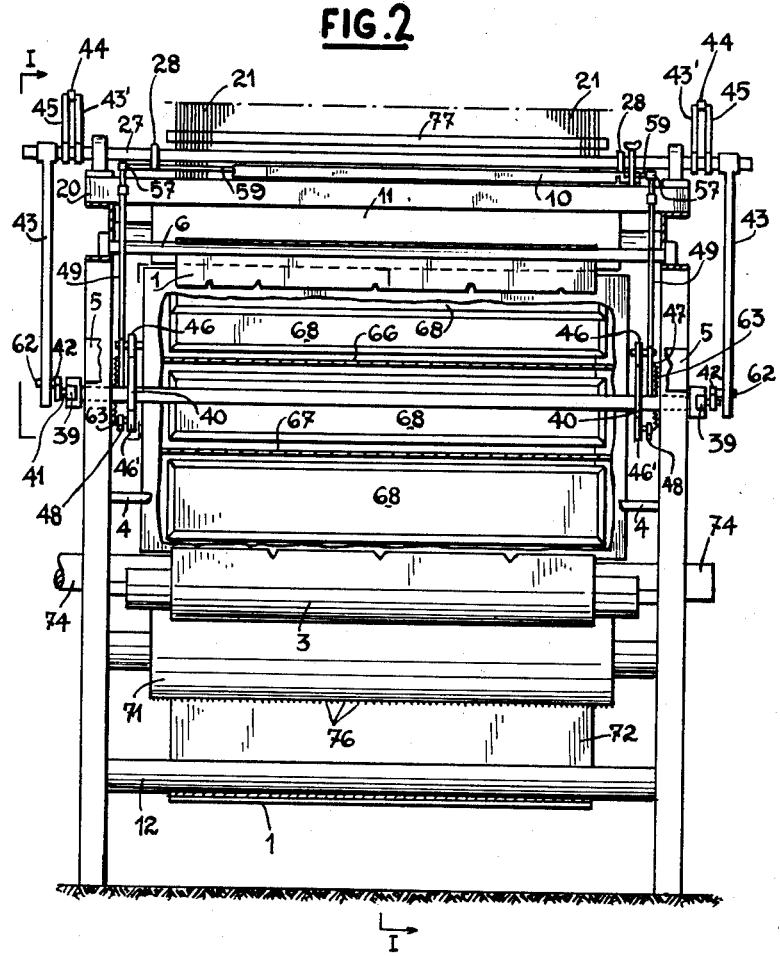
FIG. 2 is a plan view of the arrangement of FIG. 1 with certain parts omitted for the sake of clarity.

The installation shown, by way of example, in FIGS. 1 to 4, is designed for the manufacture of velvets or cloths with curled and possibly cut designs.

This arrangement uses, on the one hand, a continuous support band or strip 1, which will receive one chain of curled hair or elements, and, on the other hand, an endless support band or strip 2, which serves as temporary support for this chain of the pile.

The continuous support strip 1, which may be a strip of fabric, plastic material, paper, or the like, moved in the direction of the arrow X, and is reeled off a feed roller 3 which feeds it, through the longitudinal and lateral tensioners 4, 5 and 6, to a horizontal roller 7. From said roller 7, the surface of which may be equipped with an abrasive, said support strip 1 is guided horizontally to the mechanism where the pile is applied thereto. During this horizontal travel one face of the support strip 1 is provided with an adhesive layer 8 by means of an application device 9, equipped with a scraper blade 10, whereby the thickness of the adhesive layer may be regulated. After passing over a guide beam 20 and a horizontal roller 11, the support strip 1 with its adhesive layer 8 moves along a vertical path towards a lower roller 71, from which it leaves the machine over the small reversing roller 12.

The endless support strip 2, which may also be of fabric, plastic material, paper, or the like, moves in the direction of the arrows Z and passes over a tensioning roller 13, a roller 14, a guide beam 19 and a roller 15. On its horizontal travel, between the roller 14, which is expediently equipped with an abrasive, and the beam 19, this endless support strip is provided, either intermittently or continuously, with an adhesive layer 16, applied by means of an application device similar in design to that shown at 9, or by means of an atomizing device 17. At the end of its vertical travel and beyond the roller 15, the endless support strip 2 passes over a reversing angle 18, before returning to the tensioning roller 13.

On a part of their vertical travel, the strips 1 and 2 run parallel so that their surfaces carrying the adhesive layers 8, 16, face one another. The distance between the support strips 1 and 2 in this vertical portion is constant and determined by the height of the curls of the pile applied between the strips 1 and 2.

Figure 3:
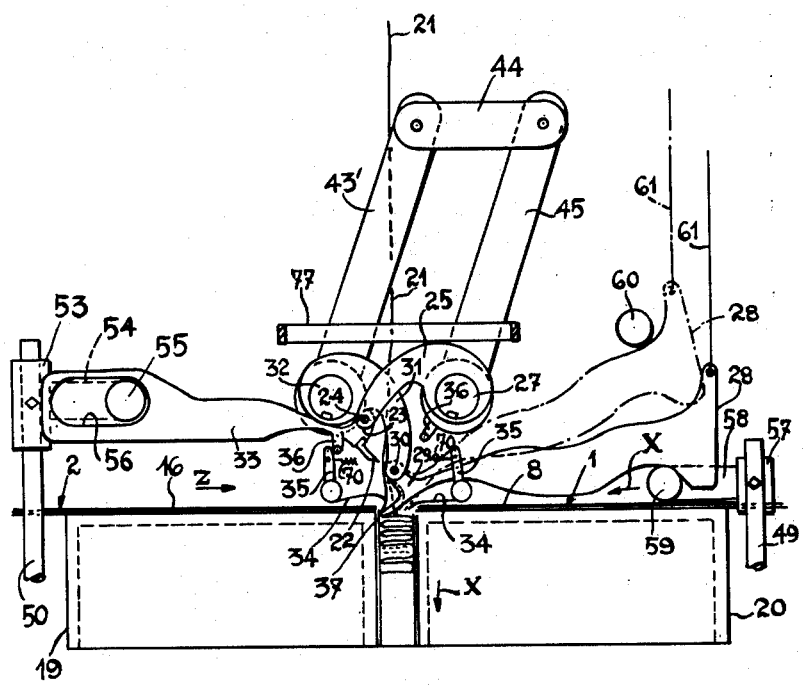
FIG. 3 shows, on an enlarged scale the mechanism for the zig-zag folding of the continuous elements between the support bands provided with adhesive layers.
Figure 4:
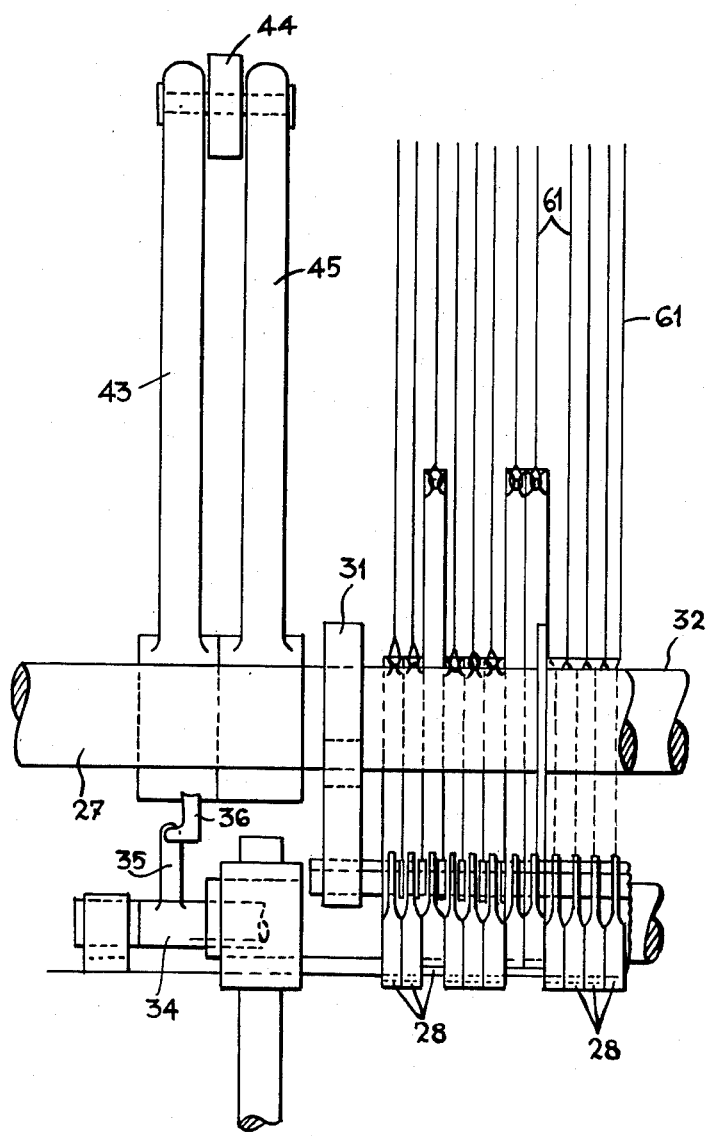
FIG. 4 is a side elevation, seen in the direction of the arrow X in FIG. 3, certain portions being cut and omitted for the sake of clarity.

The application of the pile in the arrangement shown in the drawing is effected as follows, with particular reference to FIG. 3:

Prior to the formation of the velvet, the threads 21 are delivered by bobbins or other delivery arrangements, not shown in the drawing, and are carried by a fixed or mobile comb or card 77 at a certain mutual spacing to a bending or curling mechanism, where they are folded or pleated and urged alternatively against the adhesive layer 8 of support strip 1 and against the adhesive layer 16 of strip 2.

The bending and curling mechanism comprises, on one side of the chain of threads or yarn 21, an iron component or tool 22, the length of which corresponds substantially to the width of the support strips 1 and 2. Said member 22 is mounted on the legs 23 of levers 33; each of these legs 23 is mounted on a pivot 24, carried by curved arm 25, the free end of which, remote from the end carrying the pivot 24, is supported on a shaft 27, which is actuated to effect an oscillatory movement by a mechanism which will be described later.

On the other side of the chain of threads or yarn 21, said bending and curling mechanism may comprise a series of superimposed plates 28, extending over a length corresponding substantially to the width of the support band or strips 1 and 2. Each of these plates 28 represents a tongue 29, through which passes a pivot 30, which is common for all plates, and one end of which pivot 30 is carried by a curved arm, the other free end of which is keyed to a shaft 32, which may be actuated to effect an oscillatory movement by means of a mechanism to be described later.

In the arrangement shown diagrammatically in the accompanying drawings, there is shown a bending and circling mechanism, comprising, on the one hand, a continuous tool 22, and on the other hand, a series of plates 28. Obviously, if it is desired to produce a non-woven velvet or cloth with curled or cut pile, it is possible to use as bending and curling equipment, two tools 22, located on both sides of the sheet of threads 21. On the other hand, if it is desired to produce a non-woven, patterned, for example shorn, velvet or cloth, in which the curls are cut, at least a whole series of plates 28 will have to be provided.

In order to facilitate the bending of the curls and to prevent the threads 21 from sticking over an excessive length to the adhesive layer, against which they are pressed, there is provided a metal foil 34, which is designed in one piece with the levers 35, actuated by springs 70, bell crank levers 36 forming part of the oscillating shafts 27 and 32, whereby the foil 34 is moved into the operating position. In FIG. 3, said foil 34, is in the operating position on the left side of the sheet of threads 21. In this operating position, said metal foil 34, urges the thread sheet slightly towards the right above the place where the nose 37 of the plates 28 urge the thread sheet 21 against the adhesive layer 16 of the endless support strip 2. On the other hand, to the right of the thread sheet 21, there is drawn a foil 34 in the inoperative position, into which it is constantly urged by the spring 70.

The motion of the tools 22 and of the plates 28 is controlled by the following mechanism:

To a motor shaft 38, driven at appropriate speed, there are keyed cranks 39 and cams 40. To said cranks 39 there are articulately connected at 41 connecting rods 42, which are, in turn, articulately connected at 62, to lever 43 which form part of the oscillating shaft 32. To the upper end of each lever 43' there is hinged a connecting member 44, articulated to a lever 45, which forms part of the oscillating shaft 27.

The cams 40 cooperate each with two wheels 46 and 46' which are mounted to one end of a lever 47 and to one end of a lever 48, respectively, said levers being articulately connected at 51 and 52 to connecting rods 49 and 50.

To the upper end of connecting rods 50 is fixed a sleeve 53 with a crosspiece or arm 54, to the free end of which is fixed a shaft 55, acting as a pivot which passes through a hole 56 machined into the levers 33, guiding the bending and curling tool 22.

To the upper end of connecting rods 49 there is also fixed a sleeve 57 with a crosspiece or arm 58, carrying a beam 59, whereby the plates 28 are lifted, said lifting movement being limited by a second beam 60 acting as stop.

The plates 28 are connected at their ends by the beltings or cords 61 of a Jacquard-type mechanism (not shown).

A spring 63 connects levers 47 and 48 and has the purpose of urging the wheels 46 and 46' towards the cams 40.

When the motor shaft 38 and the cranks 39 of said shaft are rotated, the shafts 27 and 32 carrying the curved arms 25 and 31 are actuated to effect an oscillatory movement through the connecting rods 42, levers 43, connecting rods 44 and levers 45. Simultaneously, due to the rolling off of the wheels 46 and 46' on the cams 40, the rearward ends of levers 33, carrying the tool 22, and the rearward ends of the plates 28, are alternatively lifted and lowered, by means of lever 48 and connecting rod 50, and by lever 47 and connecting rod 49.

Thus, the threads 21 are alternatively urged by the tool 22 and the plates 28, against the adhesive layer 16, carried by support strip 2, and against the adhesive layer 8, carried by support strip 1, so that there results a chain or threads having the form of a concertina or zig-zag, and located between the two support strips 1 and 2.

Naturally, the adhesive layers 8, 16, must hold the threads when they are applied to the adhesive layers to retain the V shape for the threads and prevent their accidental detachment. During the application of the pile 21, the two support strip run continuously and at equal velocities.

Under the advancing rollers 11 and 15, which are preferably coated with an abrasive, and the mutual distance of which may be adjustable, the two support strip with the concertina-shaped arrangement of threads or the like positioned thereinbetween, pass into a conditioning or setting zone. This setting zone comprises superimposed chambers 64, 65, with intermediate partitions 66, 67, which are detachable or replaceable. Heating means 68 or cooling means 69 are mounted in these chambers. Thus, when the adhesive layers 8 and 16, applied to the strips 1 and 2, consist of thermosetting adhesives, the heating means 68 are used to ensure the hardening or setting of the adhesive layer, whilst the cooling means 69 are used, if this adhesive layer is to be prevented from setting.

In the arrangement shown schematically in FIG. 1, the adhesive applied to the endless support strip 1 is affected by the heating means 68, causing the setting of this adhesive and ensuring the firm anchoring of the pile therein. On the other hand, the adhesive applied to the other endless support strip 2 is affected by the cooling means 69, which inhibit the setting of this adhesive, so that it is possible to remove the endless strip 2 from the strip 1 without pulling out the pile embedded in the latter where, as shown in FIG. 1, an unwoven velvet with curly pattern is to be produced.

After passing over the angle guide 18, the temporary support strip 2 carrying the adhesive, is removed from the assembly formed by the support strip 1 carrying the curled pile 72. After leaving the chamber 65, the assembly 1, 72 is cooled by means of the cooling arrangements 73 and 74 and passes then between roller 71 and a roller 75, before leaving the machine. Roller 71 is preferably equipped with sprockets 76 to ensure the positive carriage of the unwoven velvet produced in the machine.

FIGS. 5a to 5h show a series of articles which may be produced by the method of the invention.

FIG. 5a shows two pieces of unwoven cloth or velvet of the uni-cut type. In order to produce such pieces of unwoven velvet, two continuous support strips 80 and 81 are used. Each of these strips is coated with a layer of adhesive 82, 83 and the filaments are alternatively pushed or embedded into one of these two adhesive layers 82 and 83. After ensuring the setting or hardening of the adhesive layers 82 and 83 so that the filaments are firmly anchored therein, the strips 80, 81 are removed from one another by cutting in the direction of arrow A. There result two pieces of unwoven velvet or cloth with cut loops or curls, the height of which corresponds substantially to half the distance between the adhesive layers 82 and 83.

FIG. 5b shows a single, unwoven piece of unwoven cloth or velvet with curled pile. In this case, only one of the support strips, in the drawing support strip 81, serves as a final base for the cloth, whilst the other strip 80 may be of the endless type, as strip 2 in FIGS. 1 and 3. The adhesive layer 82 applied to the provisional support strip 82 remains unhardened and remains therefore easily detachable from the concertina-like layer of filaments carried by strip 81, the adhesive layer 83 of which has been hardened, so that the curls 85 adhere well to the strip 81.

FIG. 5c shows how, by cutting in the direction of arrow A, it is possible to produce two pieces of unwoven, non-uniform (patterned) cut cloth.

FIG. 5d shows an uncut, patterned, unwoven material. This cloth, as also that of FIG. 5c is produced by using pockets, or by applying the adhesive only in certain positions, whilst other positions remain uncoated, all with the use of two tools. If the continuous tools is replaced by at least one series of plates, the entire surface may be adhesive coated.

FIG. 5e shows a piece of material of unwoven cloth with curled pile with jumps in the pile. In order to produce this type of material, one of the strips 80 is completely coated with adhesive 82, whilst the other strip 81 is coated with the adhesive 83 only at certain predetermined positions, and two continuous tools are used, but the surfaces may be fully coated if one of the continuous tools is replaced by at least one series of plates; after the application of the pile in zig-zag arrangement 85, only one adhesive layer 83 is allowed to set, which coating covers the strip only at certain positions and the other strip is finally completely detached.

FIG. 5f shows the method of producing a patterned curled cloth, that is, a cloth with uneven surface. In this case, a support strip 81 with a layer of adhesive 83 is used, and a layer of filaments in zig-zag arrangement is applied thereto, between this strip 81 and provisional support strips 88, which offers a relief pattern, corresponding to the pattern of the cloth to be produced. The provisional support strip 89 is also covered by a layer of adhesive 88, which has only the purpose of retaining temporarily the filaments. In this case, adhesive layer 83 is caused to set, but not adhesive layer 88. The detachment of the temporary support strip 89 produces thus an unwoven, curled material with relief pattern.

FIG. 5g shows how, by cutting in the direction of arrow A, two identical pieces of unwoven cut, curled material, by using two series of plates or two support strips, to which the adhesive has been selectively applied.

By using in the machine a preparatory screening device as known per se it is also possible by the method of the invention to produce interwoven velvets with cut loops, as shown in FIG. 5h, where the weft or screen filaments are shown at 90.

Obviously, the invention is not limited to the preceding description and is capable of being modified in various directions, and that various devices may therein be incorporated, without departing from its principle.

I claim:

1. A method of producing unwoven cloths and velvets which comprises applying an adhesive layer to one side only of each of two backing strips, causing said strips to move through a zone in which they are disposed in spaced parallel relationship with the adhesive layer of one strip facing the adhesive layer of the other strip, feeding at least one chain of threads to said zone, alternately displacing said chain of threads against one adhesive layer and then against the other adhesive layer, just at the entrance of said zone while simultaneously deflecting said chain of threads alternately towards said adhesive layers to fold the chain of threads into loops having bent portions bound to said adhesive layers, setting at least one of said adhesive layers and subsequently separating one strip from the other.

2. Apparatus for producing unwoven cloths and velvets comprising means for applying an adhesive layer to one side only of each of two backing strips, means for guiding the backing strips into a zone in which they run parallel for a predetermined distance with the adhesive layers facing each other, means for feeding at least one chain of threads to said zone, means for displacing said chain of threads against one adhesive layer and against the other adhesive layer and for deflecting said chain of threads towards one of the adhesive layers when displacing the chain towards the other of the adhesive layers to fold the chain into loops having bent portions bound to said adhesive layers, means for setting at least one of said adhesive layers and means for separating one strip from the other.

3. Apparatus according to claim 2 in which the means for displacing and deflecting said chain comprises two oscillating blades each of which extends substantially over the entire width of the backing strips, and two flexible metal foils facing one another having free ends located just above the entrance of said zone, each of said foils being resiliently urged towards one side of said entrance when the corresponding blade thrusts the chain of threads against the adhesive layer situated on the other side of said entrance.

4. Apparatus according to claim 2 in which the means for displacing and deflecting said chain comprises two folding oscillating units, at least one of which comprises a set of oscillating plates controlled by a mechanical controlling apparatus.

References Cited in the file of this patent

UNITED STATES PATENTS

| | | |
|---|---|---|
| 1,864,478 | Ward | June 21, 1932 |
| 2,060,397 | Kleine | Nov. 10, 1936 |
| 2,160,154 | Kellogg et al. | May 30, 1939 |
| 2,242,864 | Luckhoupt | May 20, 1941 |
| 2,691,611 | Saks | Oct. 12, 1954 |
| 2,733,179 | Smith | Jan. 31, 1956 |
| 2,784,630 | Koprow et al. | Mar. 12, 1957 |

Dedication 3,127,293.—*Albert Jean Trenteseaux*, Mouscron, Belgium. METHOD OF PRODUCING UNWOVEN CLOTHS AND VELVETS AND APPARATUS USED THEREFOR. Patent dated Mar. 31, 1964. Dedication filed Apr. 14, 1982, by the assignee, *A. F. Stoddard & Co. Ltd.*

Hereby dedicates said patent to the Public.

[*Official Gazette August 10, 1982.*]